United States Patent
Suh et al.

(10) Patent No.: US 7,564,777 B2
(45) Date of Patent: Jul. 21, 2009

(54) TECHNIQUES FOR GROUP ALARM INDICATION SIGNAL GENERATION AND CLEARING

(75) Inventors: Soowan Suh, San Ramon, CA (US); Jing Ling, Fremont, CA (US); Juan-Carlos Calderon, Fremont, CA (US); Jean-Michel Caia, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 11/129,169

(22) Filed: May 13, 2005

(65) Prior Publication Data

US 2006/0256710 A1 Nov. 16, 2006

(51) Int. Cl.
*H04L 1/00* (2006.01)
*H04L 12/28* (2006.01)
*H04J 1/16* (2006.01)
*H04J 3/14* (2006.01)

(52) U.S. Cl. .................. 370/216; 370/242; 370/258; 370/907

(58) Field of Classification Search ............... 370/216, 370/242, 250, 254, 255, 258, 907
See application file for complete search history.

(56) References Cited

U.S. PATENT DOCUMENTS

| | | | | |
|---|---|---|---|---|
| 6,094,440 | A * | 7/2000 | Sugawara et al. | 370/465 |
| 6,239,699 | B1 * | 5/2001 | Ronnen | 340/365 |
| 6,456,595 | B1 * | 9/2002 | Bartholomay et al. | 370/242 |
| 6,795,451 | B1 * | 9/2004 | Giorgetta et al. | 370/510 |
| 7,200,157 | B1 * | 4/2007 | Hessler et al. | 370/509 |
| 7,304,998 | B2 * | 12/2007 | Kada et al. | 370/395.1 |
| 7,352,780 | B1 * | 4/2008 | Conklin et al. | 370/514 |
| 2002/0191244 | A1 * | 12/2002 | Antosik et al. | 359/110 |
| 2006/0187715 | A1 * | 8/2006 | Narvaez et al. | 365/185.24 |

OTHER PUBLICATIONS

International Telecommunication Union Telecommunication Standardization Sector, *Link Capacity Adjustment Scheme (LCAS) for Virtual Concatenated Signals*, Document No. G.7042/Y.1305, Feb. 2004, 23 pages.
International Telecommunication Union Telecommunication Standardization Sector, *Network Node InterfacetSynchronous Digital Hierarchy (SDH)*, Document No. G707/Y.1322, Oct. 2000, cover page and Section 11.2, (pp. 120-123).
International Telecommunication Union Telecommunication Standardization Sector, *Characteristics of Synchronous Digital Hierarchy (SDH) Equipment Functional Blocks*, Document No. G.783, Feb. 2004, cover page and Sections 8.2.5.1, 12.5 (pp. 19-20, 158-178).
International Telecommunication Union Telecommunication Standardization Sector, *Characteristics Transport Equipment—Description Methodology and Generic Functionality* Document No. G.806, Feb. 2004, cover page and Sections 6.2.6.2, 6.3.1, 63.4 (beginning with subsection entitled "Consequent Actions"), Figure 10.6, Appendix III (pp. 36, 39-40, 77, 84-85, 98-100).

* cited by examiner

*Primary Examiner*—Chi H Pham
*Assistant Examiner*—Ahmed Elallam
(74) *Attorney, Agent, or Firm*—Caven & Aghevli LLC

(57) ABSTRACT

In a communication system that uses virtually concatenated payloads, techniques to determine when to declare and when to clear alarm indication signal (AIS) for a group. The declaration of AIS for a group may occur based on when declaration of AIS for a member of a group occurs. The clearing of group AIS may occur based on when clearing of AIS by a last member of a group to clear AIS occurs.

20 Claims, 11 Drawing Sheets

US 7,564,777 B2

TECHNIQUES FOR GROUP ALARM INDICATION SIGNAL GENERATION AND CLEARING

FIELD

The subject matter disclosed herein relates to techniques to generate and clear alarm indication signals.

RELATED ART

Data communication networks receive and transmit ever increasing amounts of data. Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI) whereas SDH is the international version of the standard published by the International Telecommunications Union (ITU). As used herein, the SONET/SDH concepts are more fully detailed in various ANSI and ITU standards, including but not limited to the discussion of concatenated payloads, ITU-T G.707 (2000), T1.105-2001 (draft), and T1.105.02-1995.

SONET/SDH may employ virtually concatenated payloads. The virtual concatenation payload support for a SONET/SDH network requires compensation for differential delay among members of the same group. Differential delay may result from the payload, which is divided into members, taking different paths through the network, pointer processing, or other issues. Accordingly, data generated at the same time at a source node (with the same multi-frame indication (MFI)) in the same group may arrive at a destination node at different times. Further, if the network provides Link Capacity Adjustment Scheme (LCAS) support, new payload members may be added or existing members may be removed, which may vary the arrival times of members. LCAS is described for example in Link Capacity Adjustment Scheme (LCAS), ITU-T G.7042 (2004).

Data from different members are typically stored upon arrival at the destination node. The data from different members may be stored in memory (typically called an "alignment buffer") when they arrive. The data are re-combined at the output of the destination node so that the original transmission times are recovered after differential delay compensation of all members. Differential delay compensation may enable processing of all virtual concatenation payload groups at the destination node at one time. In other words, the destination node may read all data from members having the same MFI at one time.

BRIEF DESCRIPTION OF THE DRAWINGS

For example.

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1A:
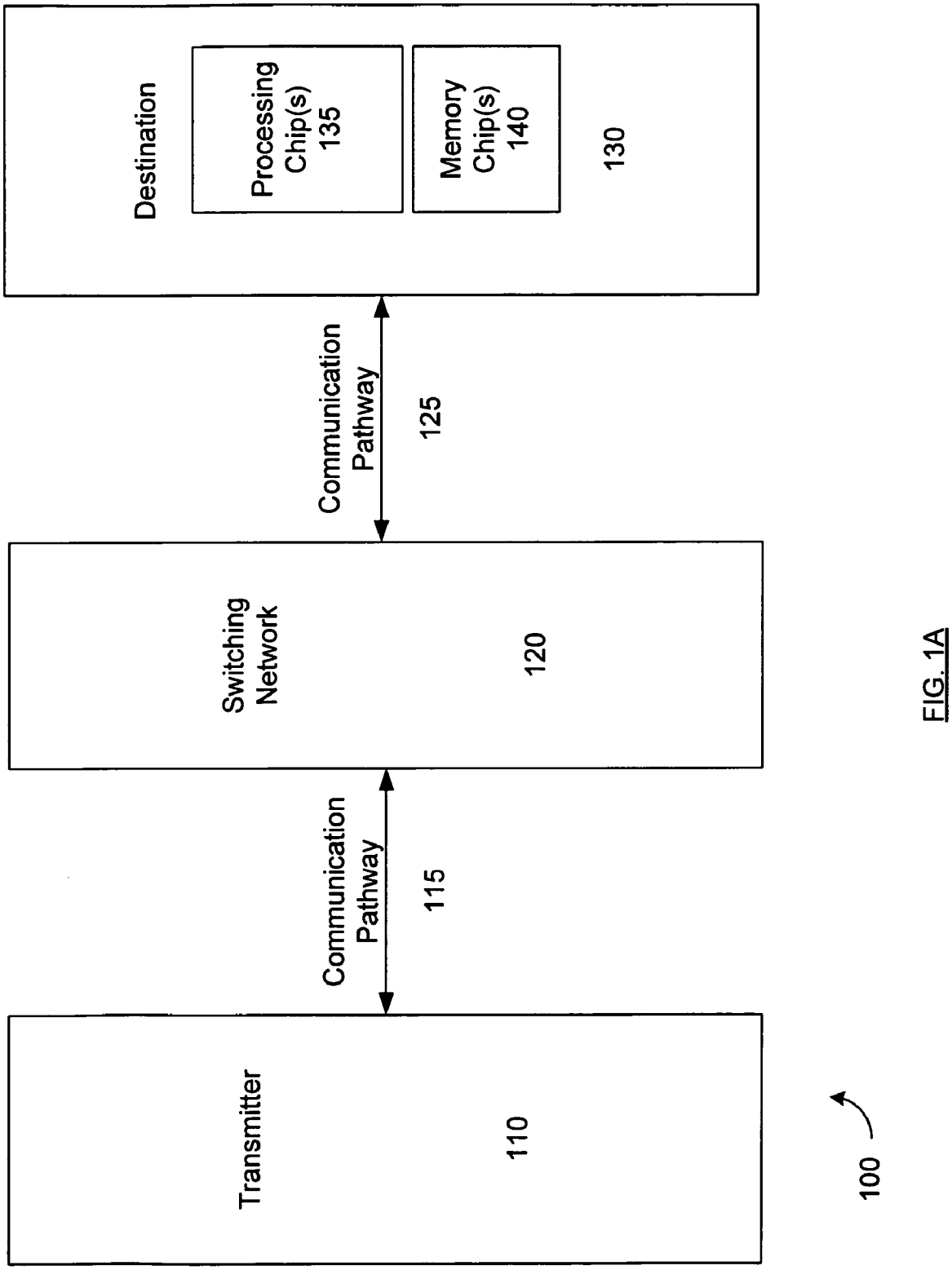
FIG. 1A depicts a SONET/SDH switching system.

A SONET/SDH switching system 100 is shown in FIG. 1A. In the SONET/SDH switching system 100, a transmitter 110 is connected through a communication pathway 115 to a switching network 120. Switching network 120 is connected through a communication pathway 125 to a destination 130. The transmitter 110 sends data as a series of payloads/frames to the destination 130 through the switching network 120. In the switching network 120, frames and packets may pass through a series of hardware and/or software components, such as servers. As each payload arrives at a hardware and/or software component, the component may store the payload briefly before transmitting the payload to the next component. The payloads proceed individually through the network until they arrive at the destination 130. The destination 130 may include one or more processing chips 135 and/or one or more memory chips 140.

Figure 1B:
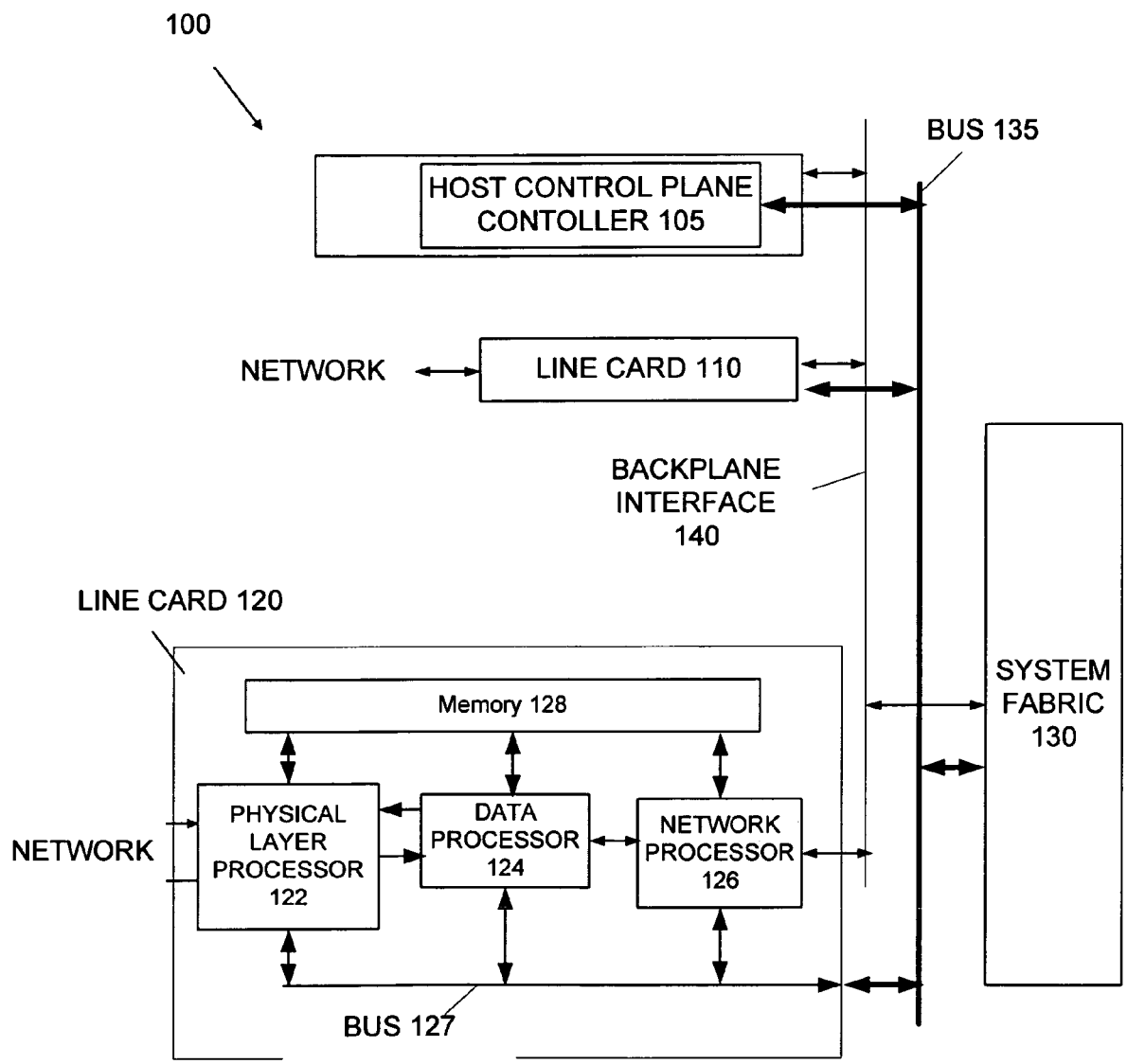
FIG. 1B depicts a suitable system in which some embodiments of the present invention may be used.

FIG. 1B depicts a suitable system in which some embodiments of the present invention may be used. System 100 may include host control plane controller 105, line card 110, line card 120, system fabric 130, bus 135, and backplane interface 140. As used herein, "egress unit" means a sequence of one or more symbols and/or values that may be encoded by one or more signals transmitted through a network from at least one sender to at least one receiver. As used herein, "ingress unit" means a sequence of one or more symbols and/or values that may be encoded by one or more signals transmitted from at least one sender to at least one receiver and received from a network.

Host-control plane controller 105 may control and configure operations of all devices in system 100 (including but not limited to system fabric 130 and line cards 110 and 120). For example, host-control plane controller 105 may program/provision data processor 124 of line card 120 to control the arrangement of content in egress units and the processing of content of ingress units. Host-control plane controller 105 may communicate with devices in system 100 using bus 135. Host-control plane controller 105 may be implemented using a line card.

Bus 135 may provide intercommunication among host-control plane controller 105, line card 110, line card 120, and system fabric 130. Bus 135 may comply with Peripheral Component Interconnect (PCI) Local Bus Specification, Revision 2.2, Dec. 18, 1998 available from the PCI Special Interest Group, Portland, Ore., U.S.A. (as well as revisions thereof); PCI Express described in The PCI Express Base Specification of the PCI Special Interest Group, Revision 1.0a (as well as revisions thereof); or PCI-X Specification Rev.

1.0a, Jul. 24, 2000, available from the aforesaid PCI Special Interest Group, Portland, Ore., U.S.A., although other standards may be used; although other standards may be used.

Line card 110 may be implemented as a SONET/SDH add-drop multiplexer, a Fibre Channel compatible line input, an Ethernet line input, a SONET/SDH line input, or a line card similar to line card 120, although line card 110 may provide other operations. Line card 110 may be capable of communicating with a network. For example, the network may be any network such as the Internet, an intranet, a local area network (LAN), storage area network (SAN), a wide area network (WAN).

Line card 120 may be implemented as a transceiver capable of transmitting egress units to a network and receiving ingress units from a network in compliance with SONET/SDH as well as other protocols such as optical transport network (OTN), although other standards may be used. OTN is described at least in ITU-T Recommendation G.709 Interfaces for the optical transport network (OTN) (2001).

One embodiment of line card 120 may include physical layer processor 122, data processor 124, network processor 126, bus 127, and memory 128. Physical layer processor 122 may receive optical or electrical signals from a network and prepare the signals for processing by downstream elements such as data processor 124. For example, for ingress units, physical layer processor 122 may convert an optical signal to electrical format, perform physical layer processing, and/or remove jitter from signals from the network. For egress units, physical layer processor 122 may remove jitter from signals provided by upstream devices such as data processor 124, perform physical layer processing, and prepare signals for transmission to the network, which may be optical or electrical format. For example, an SFI-4 interface (described for example in the Optical Internetworking Forum document OIF-SFI4-01.0) may be used to provide communication between physical layer processor 122 and data processor 124, although other interfaces may be used.

Data processor 124 may construct egress units in formats such as SONET/SDH and/or OTN (although other formats may be used). For ingress units, data processor 124 may process ingress units in compliance with formats such as SONET/SDH and/or OTN (although other formats may be used). In accordance with some embodiments, data processor 124 may include capability at least to declare and clear group AIS as well as to perform delay compensation in accordance with techniques described herein.

Network processor 126 may provide payloads to data processor 124 for encapsulation and transmission to a network in egress units. Network processor 126 may receive payload contents of ingress units from data processor 124. For example, data processor 124 and network processor 126 may intercommunicate using an interface compatible for example with SPI-4 (described for example in the Optical Internetworking Forum document OIF-SPI4-02.1) or SPI-3 (described for example in the Optical Internetworking Forum document OIF-SPI3-01.0), although interfaces compatible with other standards may be used.

Network processor 126 may at least perform layer 2 or layer 3 (as well as other higher layer level) processing on payloads provided by and to data processor 124 as well as operations such as, but not limited to, classification, metering and policing, queue management, transmit scheduling, and traffic shaping in conformance with applicable protocols. For example, network processor 126 also may perform traffic management at the internet protocol (IP) layer (described for example in RFC 791 (1981) available from the Defense Advanced Research Projects Agency). Network processor 126 may intercommunicate with switch fabric 130 using backplane interface 140 to transfer and receive packets/frames having formats such as, but not limited to, High Level Data Link Control (HDLC), internet protocol (IP), Asynchronous Transfer Mode (ATM), Generic Framing Procedure (GFP), and Ethernet.

Bus 127 may provide intercommunication among physical layer processor 122, data processor 124, and network processor 126. Bus 127 may be compliant with the same standards as those of bus 135.

In some embodiments, one or more of physical layer processor 122, framer 124, or network processor 126 may be communicatively coupled to memory module 128. For example, memory 128 may include one or more of the following: read-only memory (ROM), programmable ROM (PROM), erasable PROM (EPROM), electrically EPROM (EEPROM), a disk drive, a floppy disk, a compact disk ROM (CD-ROM), a digital video disk (DVD), flash memory, a magneto-optical disk, or other types of nonvolatile machine-readable media suitable for storing electronic instructions and/or data.

In one embodiment, components of line card 120 may be implemented among the same integrated circuit. In one embodiment, components of line card 120 may be implemented among several integrated circuits that intercommunicate using, for example, a bus or conductive leads of a motherboard. In one embodiment, components of line card 120 may be implemented as any or a combination of: hardwired logic, software stored by a memory device and executed by a microprocessor, firmware, an application specific integrated circuit (ASIC), and/or a field programmable gate array (FPGA).

Backplane interface 140 may be implemented as a single or multi-pin interface and may be used by line cards to intercommunicate with system fabric 130 or to intercommunicate with other line cards. For example, backplane interface 140 may be compatible with TFI-5 (described, for example, in TDM Fabric to Framer Interface Implementation Agreement (2003) available from the Optical Internetworking Forum (OIF)) or CSIX (described in CSIX-L1: Common Switch Interface Specification-L1 (2000)), although other interfaces may be used. System fabric 130 may transfer payloads as well as other information among line cards based on relevant address and header information. System fabric 130 can be implemented as a packet switch fabric or a time domain multiplexing (TDM) cross connect.

In virtual concatenation, each synchronous payload envelope (SPE) within a concatenated group representing the data frame for transmission may have an identifier, called a Multi-Frame Identifier (MFI). The MFI forms part of the SONET/SDH path overhead information in the SPE and indicates the SPE's sequence and position within the group. As may be appreciated, the ability to identify the individual payloads by the MFI provides the ability for the system to split the payloads into various sizes or configurations as long as the MFI is provided with each payload.

Figure 2:
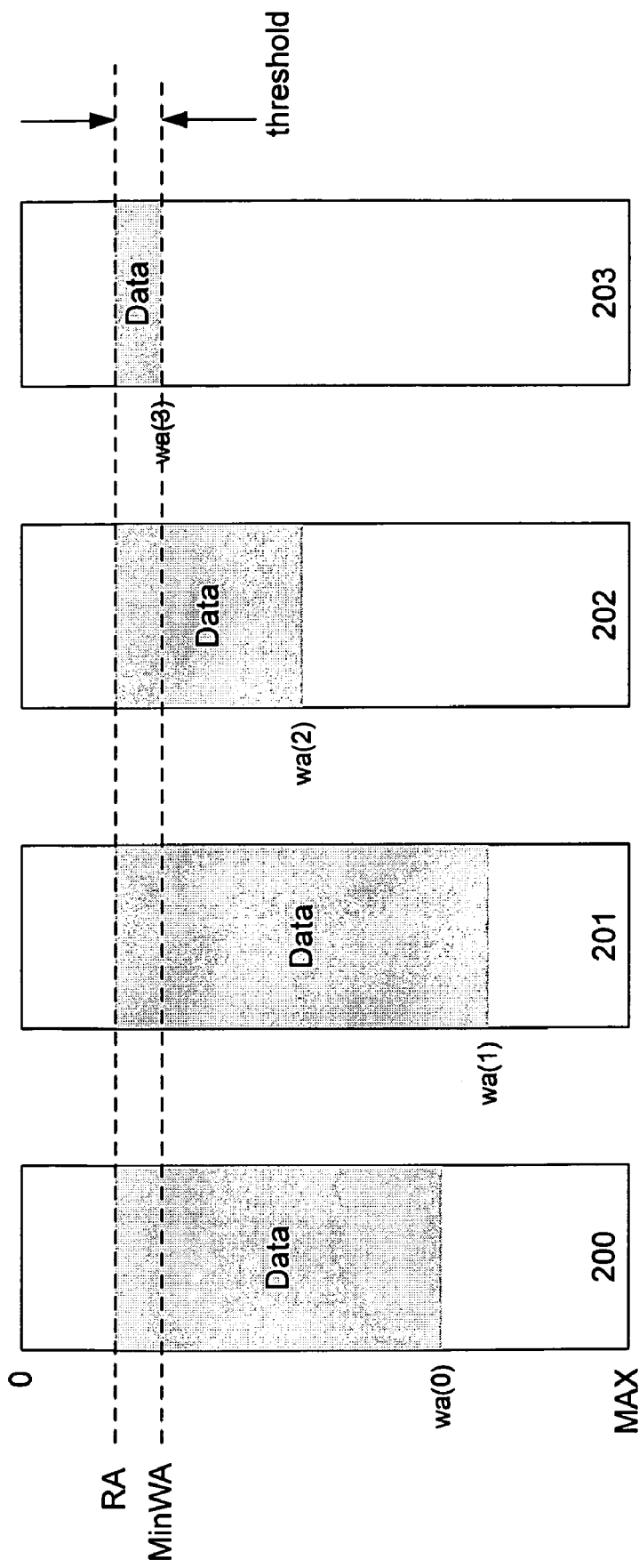
FIG. 2 depicts examples of data buffers, in accordance with embodiments of the present invention.

FIG. 2 depicts four data buffers 200-203 that can be used to store different members of the same group at a destination, in accordance with embodiments of the present invention. Address 0 is the lowest addressable space and is at the top of each buffer whereas address MAX is the highest addressable space and is at the bottom of each buffer. Read addresses (shown as RA) are uniformly located across data buffers 200-203. Data bytes from different members may be read from the same address (i.e., at the same position in the frame and multi-frame structure) at the same time at the read address shown as "RA". Minimum write addresses (shown as minWA) also located across the data buffers 200-203 may be separated from the read addresses by a threshold value. The threshold may be based on a delay from when members are written to when they are available to be read. Data may be written to the end of the existing data and thus wa(0) through wa(3) may represent the current write addresses for each of the data buffers 200-203. The write addresses (shown as wa(0) to wa(3)) of each member in a virtual concatenation scheme include an MFI value in addition to the current data byte and position in the frame for the byte as it is received at the destination node.

For example, in some embodiments, a suitable scheme for storing members into memory (such as but not limited to memory 128 of FIG. 1B) includes but is not limited to techniques described in U.S. patent application Ser. No. 11/093,907, inventors Ling, Calderon, and Suh, and filed Mar. 30, 2005, published as U.S. Published Application No. 20060221944 on Oct. 5, 2006. For example, techniques to store members into memory may include receiving a plurality of data frames representing at least one virtually concatenated data stream; storing the plurality of data frames in a memory; and recording, for each of the plurality of data frames, a physical write address that indicates a position in the memory and a virtual write address that includes a multiframe indicator and a byte number indicator. The storing the plurality of data frames in a memory may include writing the received data into the memory in a continuous configuration.

ITU-T Recommendation G.783 (2004) states that all-ONEs (AIS) signal (complying to the frequency limits for the interface) shall be output within 250 μs (microseconds) of declaration of a group aAIS whereas normal data shall be output within 250 μs (microseconds) of clearing of aAIS. Similarly, ITU-T recommendation G.806 (2004) describes output of AIS signal. Some conditions that may result in AIS include, but are not limited to, AI_TSF (Trail Signal Fail), LOM (Loss of Multiframe), MND (Member Not Deskewable), and SQM (Sequence Mismatch).

For a virtually concatenated group, different members in the same group may not declare AIS at the same time due to different arrival times of members in the same group and also due to different paths each member may take (i.e., different paths may experience problems at different times). In accordance with some embodiments of the present invention, techniques are provided to determine when to declare and clear group AIS.

Figure 3:
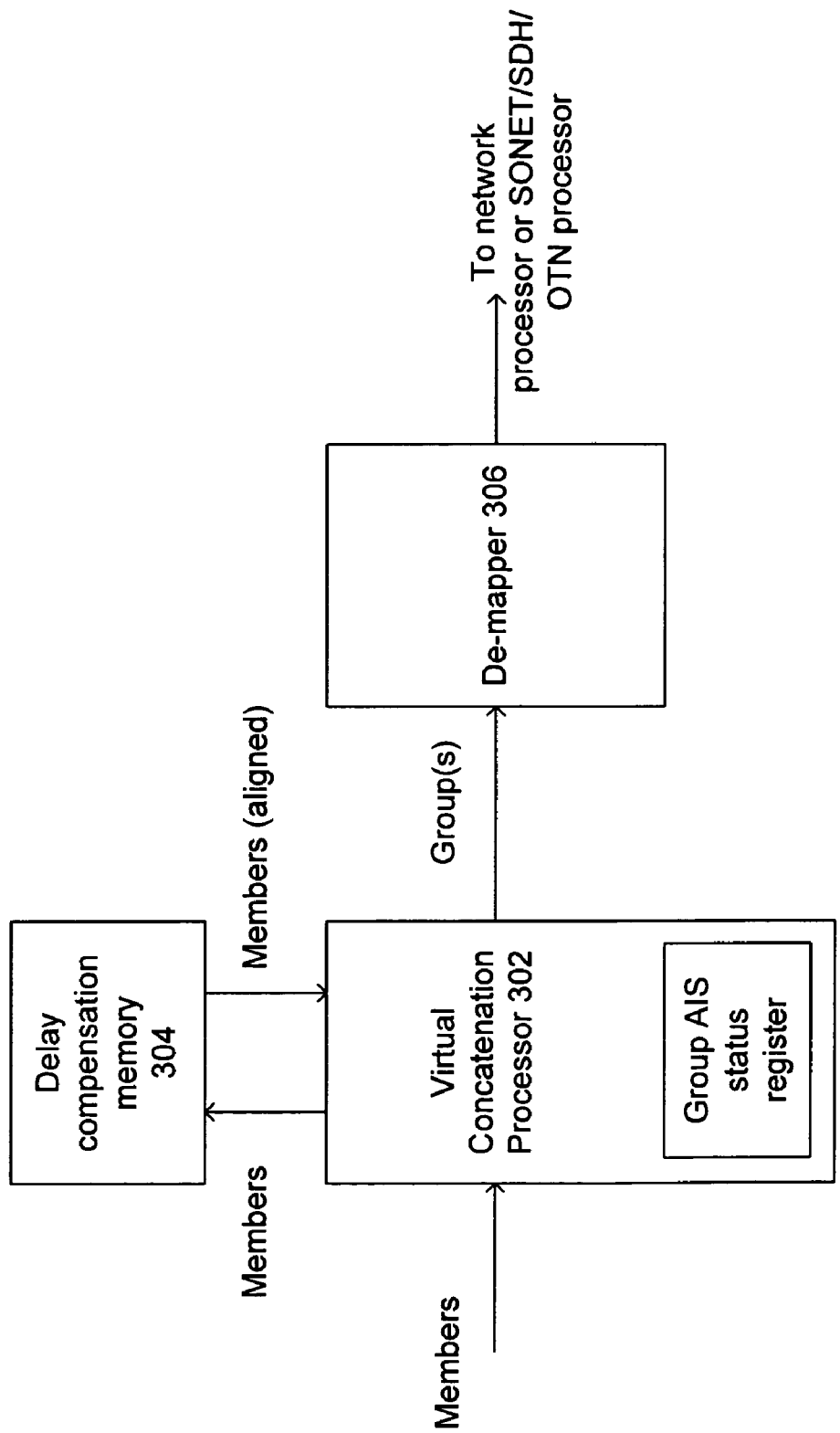
FIG. 3 depicts an example system that may be used at least for declaring and clearing group AIS, in accordance with embodiments of the present invention.

FIG. 3 depicts an example system that may be used at least for declaring and clearing group AIS, in accordance with embodiments of the present invention. For example, some embodiments of the system may include virtual concatenation processor 302, delay compensation memory 304, and de-mapper 306.

Virtual concatenation processor 302 may receive members which may have differential delay relative to members of the same group. For example, members may be provided from SONET/SDH or OTN frames. For example, virtual concatenation processor 302 may receive members from a source such as but not limited to a SONET/SDH path processing logic. For example, SONET/SDH path processing logic may process path overhead from a SONET/SDH frame. Virtual concatenation processor 302 may store members in delay compensation memory 304. Virtual concatenation processor 302 may at least perform delay compensation on members in accordance with relevant standards such as but not limited to ITU-T G.707.

Delay compensation memory 304 may receive members from virtual concatenation processor 302 and may provide aligned members with delay compensation performed in accordance at least with ITU-T G.707. For example, alignment of members may take place in accordance with instruction from virtual concatenation processor 302. In some embodiments, delay compensation memory 304 may store SONET/SDH or OTN frames and may not be used to store AIS conditions. For example, members may be written into and read from delay compensation memory 304 at least in accordance with techniques described with respect to FIG. 2.

Virtual concatenation processor 302 may provide group(s) to de-mapper 306 using aligned members. For example, group(s) may include payloads from SONET/SDH or OTN frames. For example, when payloads include Time Division Multiplexed (TDM) traffic, virtual concatenation processor 302 may convert virtually concatenated payload into contiguously concatenated payload and provide such contiguously concatenated payload to de-mapper 306. For example, when payloads include data packets, virtual concatenation processor 302 may transfer the data extracted from the payloads as a group(s) to de-mapper 306. De-mapper 306 may thereafter extract packets from such data.

In some embodiments, virtual concatenation processor 302 may include logic to declare and clear group AIS. In some embodiments, virtual concatenation processor 302 may include a group AIS status register to indicate group AIS condition or lack of group AIS condition. For example, virtual concatenation processor 302 may utilize techniques to declare and clear group AIS described herein. After a group AIS is declared, virtual concatenation processor 302 may output all-ONEs to de-mapper 306 in the whole group(s) in accordance at least with ITU-T G.783. Further, after group AIS is cleared, virtual concatenation processor 302 may clear all-ONEs in a group(s) and output actual contents of group(s) based on contents of aligned members in accordance at least with ITU-T G.707 and ITU-T G.783.

Although ITU-T G.806 does not specify a maximum time delay from the detection of the defects triggering the AIS to effective AIS signal insertion, some embodiments may apply a time delay that is as short as possible in order to avoid downstream propagation of undesirable and erroneous traffic.

In some embodiments, SONET/SDH systems supporting virtual concatenation also comply with ITU-T G.806. In some embodiments, inserting AIS occurs after delay compensation. Inserting AIS occurs after delay compensation also provides the advantages, but not necessary features of any embodiment, of (1) not losing the traffic stored in the delay compensation buffer that was received and delay compensated prior to the detection of the defect triggering the AIS signal and (2) inserting a coherent AIS signal on the overall virtual concatenation group (simultaneously from all members at the output of a receive Virtual Concatenation adaptation operation).

De-mapper 306 may discard group(s) or forward group(s) provided by virtual concatenation processor 302. For example, if group(s) include all-ONEs, de-mapper 306 may discard contents that are all-ONEs when a group AIS condition is present in accordance, for example, with ITU-T G.783 or ITU-T G.806. Otherwise, de-mapper 306 may extract TDM traffic using SONET/SDH or OTN header information contained in the group(s) and transfer the TDM traffic to a device such as but not limited to SONET/SDH/OTN processor. For example, the SONET/SDH/OTN processor may extract SONET/SDH or OTN frames encapsulated in payloads of SONET/SDH or OTN frames; recover timing information; and then provide extracted SONET/SDH or OTN frames for transmission over TDM backplane or TDM network. In addition or as an alternative, de-mapper 306 may transfer data from packets from a group to a network processor such as but not limited to network processor 126.

In some embodiments, when any member of a virtually concatenated group declares AIS, AIS for the group may be declared substantially immediately. For example, an AIS for any member of a virtually concatenated group may be declared as described in ITU-T G.783 or ITU-T G.806. In some embodiments, this group may output all-ONEs within 250 µs (microseconds) of AIS declaration of any of its members, although other times may be used. Accordingly, outputting all-ONEs may occur after declaration of group AIS. For example, when any member declares AIS, it may not be possible to determine the MFI value for this member and thus may not be possible to determine the transmission time of this member relative to all other members. For example, an MFI value may describe a transmission time of a member and can be used to determine alignment with other members.

In some embodiments, member(s) with AIS condition are not removed as per Link Capacity Adjustment Scheme (LCAS) either at least because LCAS is not used in the application or because network management does not use LCAS to remove this type of faulty member.

Figure 4:
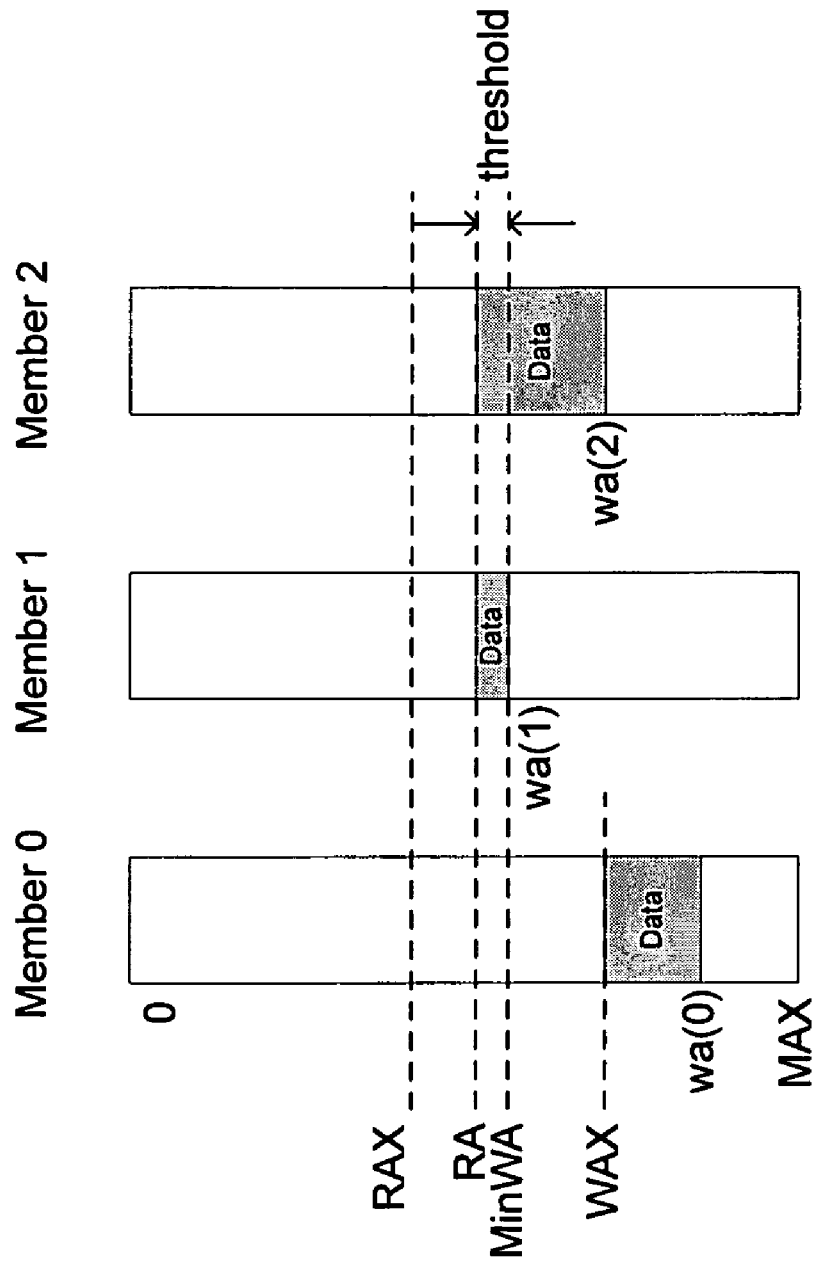
FIG. 4 depicts an example scenario used to illustrate when an AIS condition for a group may be cleared, in accordance with embodiments of the present invention.

FIG. 4 depicts an example scenario used to illustrate when an AIS condition for a group may be cleared, in accordance with embodiments of the present invention. When the AIS condition is cleared for a member, it may not be desirable to clear the group AIS immediately. Clearing of an individual AIS value may be carried out in a manner described for example in ITU-T G.783 or ITU-T G.806. For example, when the same read address is used to read data across all members, one reason it may not be desirable to clear the group AIS immediately may be all data written into one or more member(s) when AIS of any member is declared is invalid. In some embodiments, actual data content from aligned members of a group may be output after clearing of group AIS.

In some embodiments, a clearing event of group AIS may be determined when either of the following two conditions is met after AIS clearing for member X:

(1) RA=WAX; or
(2) (wa(X)−RA)<(WAX−RA),
where:
  X may represent the last member in a group to clear individual AIS, where the group includes members 0 to 2 in this example, although other numbers of members may be used;
  RAX may represent a group read address on occurrence of AIS clearing for member X;
  RA may represent a current group read address across all members of a group;
  MinWA may represent a minimum permissible-write address for any member of a group;
  WAX may represent a write address for member X when AIS for member X is cleared;
  wa(i) may represent a current write address of a member of a group (where, in this example, i=0 to 2);
  wa(X) may represent current write address for member X, which is member 0 in this example; and
  MAX may represent a maximum addressable read or write location in each member of a group.

In this example, the current write address for each member (wa(i)) may be different but subject to MinWA. For example, the MinWA may be offset from the current read address (RA) for all members in a group by a minimum threshold. In this example, read and write addresses may increase in value from MinWA to MAX and may wrap-around after address MAX. The read and write addresses may be virtual addresses composed of Multi-Frame Indication (MFI) concatenated with a byte position in the payload of a frame, although other addressing schemes may be used. Virtual addresses may or may not be equal to the physical memory addresses.

Note the above subtraction in prong (2) above is used at least because wrap around circular buffers are used (i.e., the write and read addresses increase in value from beginning (address 0, in the example of FIG. 4) to end (address MAX in the example of FIG. 4) and then wrap-around. For example, wrap around of MFI value in the virtual addresses may be used.

For example, FIGS. 5-9 depict example scenarios that illustrate aspects of embodiments of the present invention. In the examples of FIGS. 5-9, member 0 is the last member in a group to have AIS cleared. RA0 may represent a group read address on occurrence of AIS clearing for member 0 and WA0 may represent a write address for member 0 when AIS for member 0 is cleared. Data written in member 0 between RA0 and WA0 may not be valid because the AIS condition was not cleared when data was written into member 0 between RA0 and WA0. Accordingly, for member 0, the depicted grey shaded data may be valid because it was not written between RA0 and WA0. Therefore, at least because the same read address is used across all members of a group and the group read address may be located between RA0 and WA0, the AIS condition for the group is not cleared when AIS for member 0 is cleared.

Figure 6:
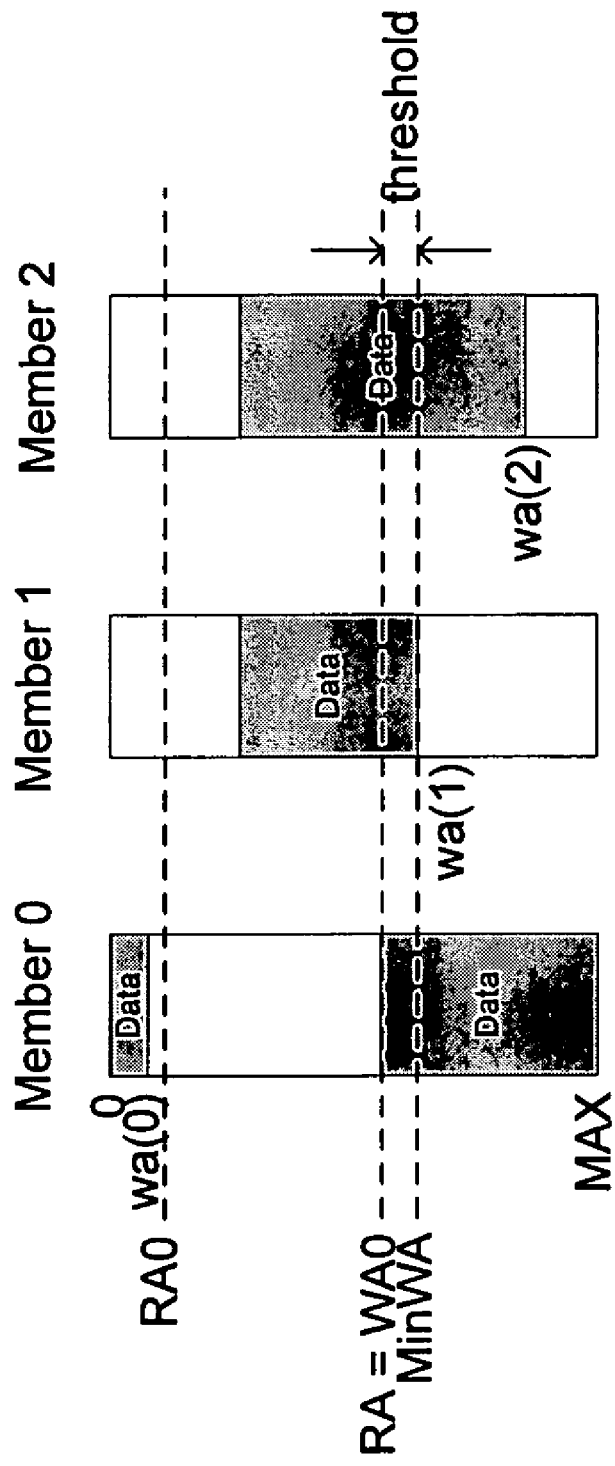

Referring to FIG. 6, to ensure the output data for the whole group is valid when AIS is cleared, AIS may be cleared when the read address (shown as RA) is equal to the write address of member 0 when AIS condition for member 0 is cleared (shown as WA0). For example, in some embodiments, the following condition may determine a group AIS clearing time: RA=WA0.

Figure 5:
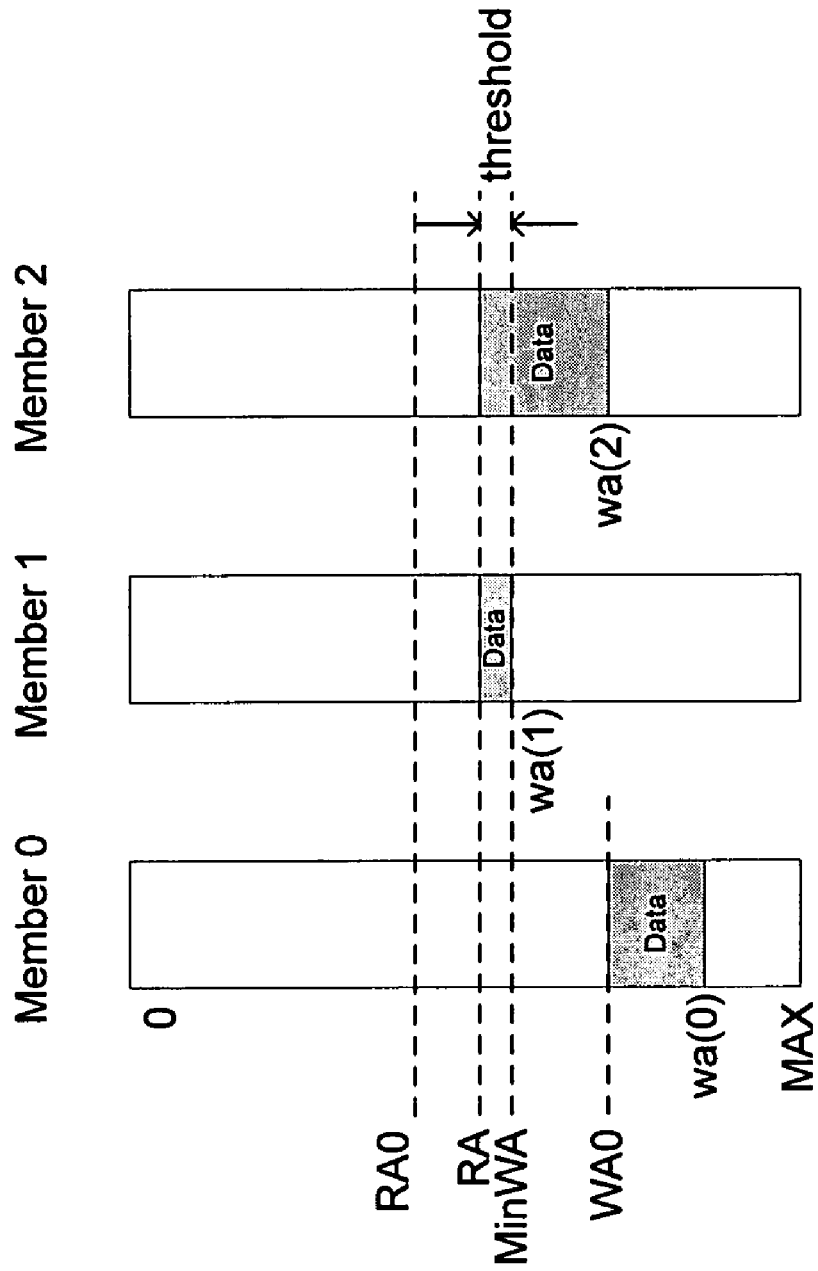
FIGS. 5-9 depict example scenarios that illustrate aspects of embodiments of the present invention.
Figure 7:
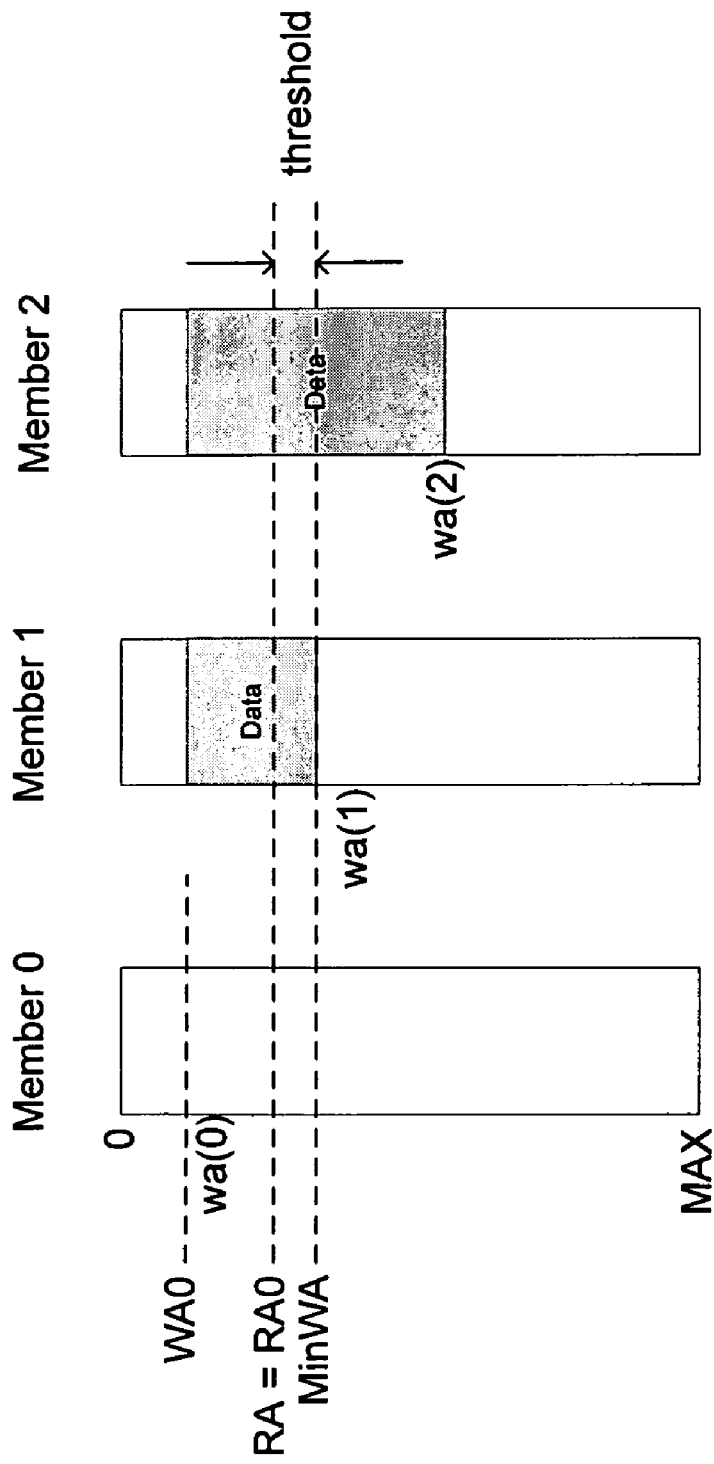
Figure 8:
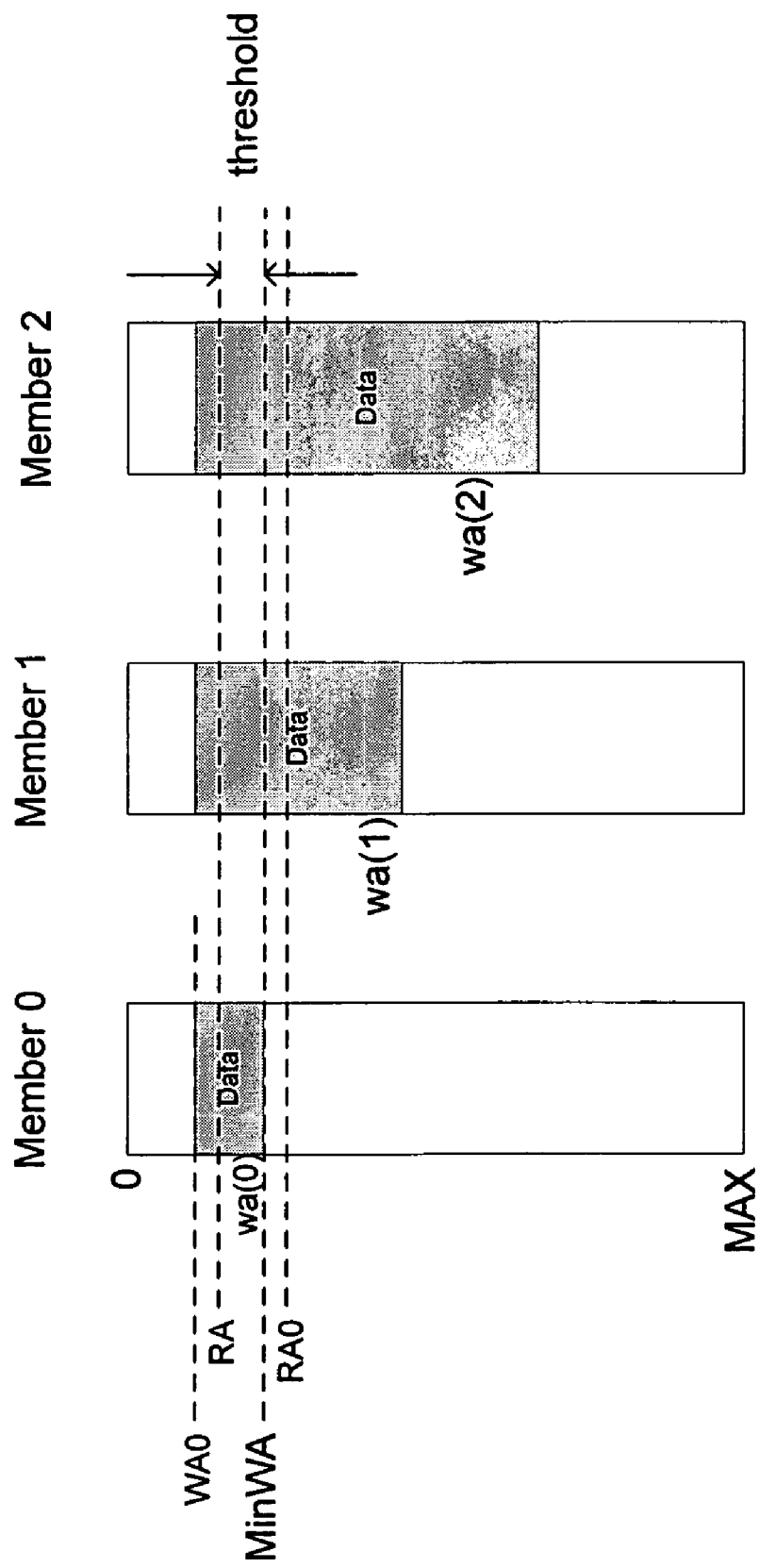
Figure 9:
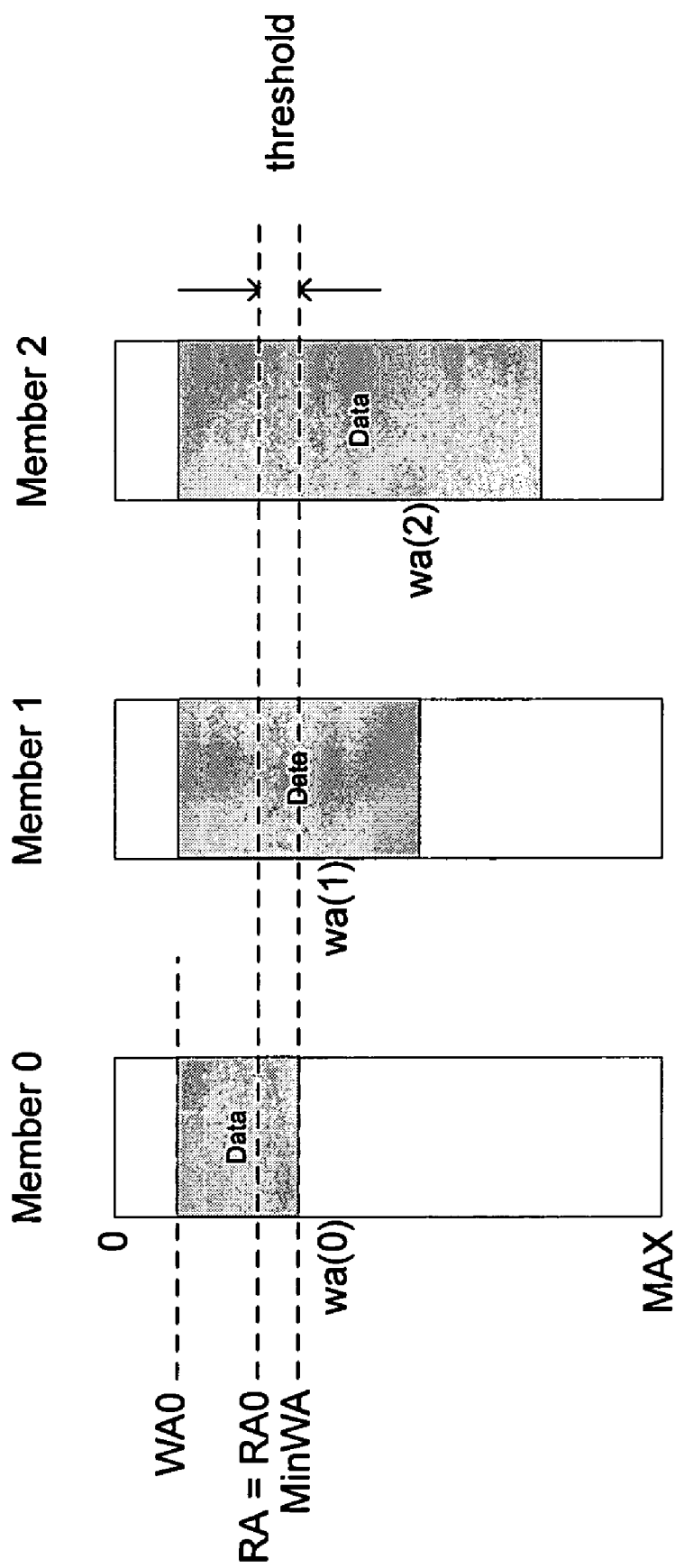

In the examples of FIGS. 7-9, to store members, circular buffers are used (i.e., the write and read addresses increase in value from beginning (address 0) to end (address MAX) and there is wrap around of addresses. In the examples of FIGS. 5 and 6, circular buffers may but do not have to be used. Referring to FIG. 7, when AIS condition is cleared for member 0, the write address of member 0 (WA0) may lag behind the group read address at the time depicted (RA). This condition could happen, as stated at least in ITU-T G.783, due to when member 0 is in AIS condition, its write address is not included to generate minimum write address for this group, and thus is not counted towards the group read address. When AIS condition is cleared for member 0, the minimum group write address is changed to WA0, instead of the current group minimum write address (marked as MinWA in the above diagram). The group read address can be changed to consider the new group minimum write address (and thus be based on the write address of member 0 when member 0 is not in AIS condition) using at least one of the two cases. An illustration of the first case is shown in FIG. 8 whereas an illustration of the second case is shown in FIG. 9.

As shown in FIG. 8, group read address (RA) can be changed to the address of WA0 minus threshold immediately. In some embodiments, this immediate change of the RA could be used when LCAS is not supported. In this case, due to processing delay to generate the minimum write address and group read address, the first valid group read address (RA) can be greater than WA0.

As shown in FIG. 9, the group read address (RA) can wait for the write address of member 0 to catch up to RA0. The change of the RA of this scenario could be used in cases with LCAS support.

In this second case, the group read address (RA) is greater than WA0. When RA is greater than WA0, RA would not be equal to WA0 until after going through the full address space (RA from the current read address and wraps around until it reaches WA0). This long wait (for read address to reach WA0) is not necessary, as the output data is already valid at current group read address, RA0. Accordingly, in some embodiments, group AIS may be cleared when (wa(0)−RA)<(WA0−RA).

Figure 10:
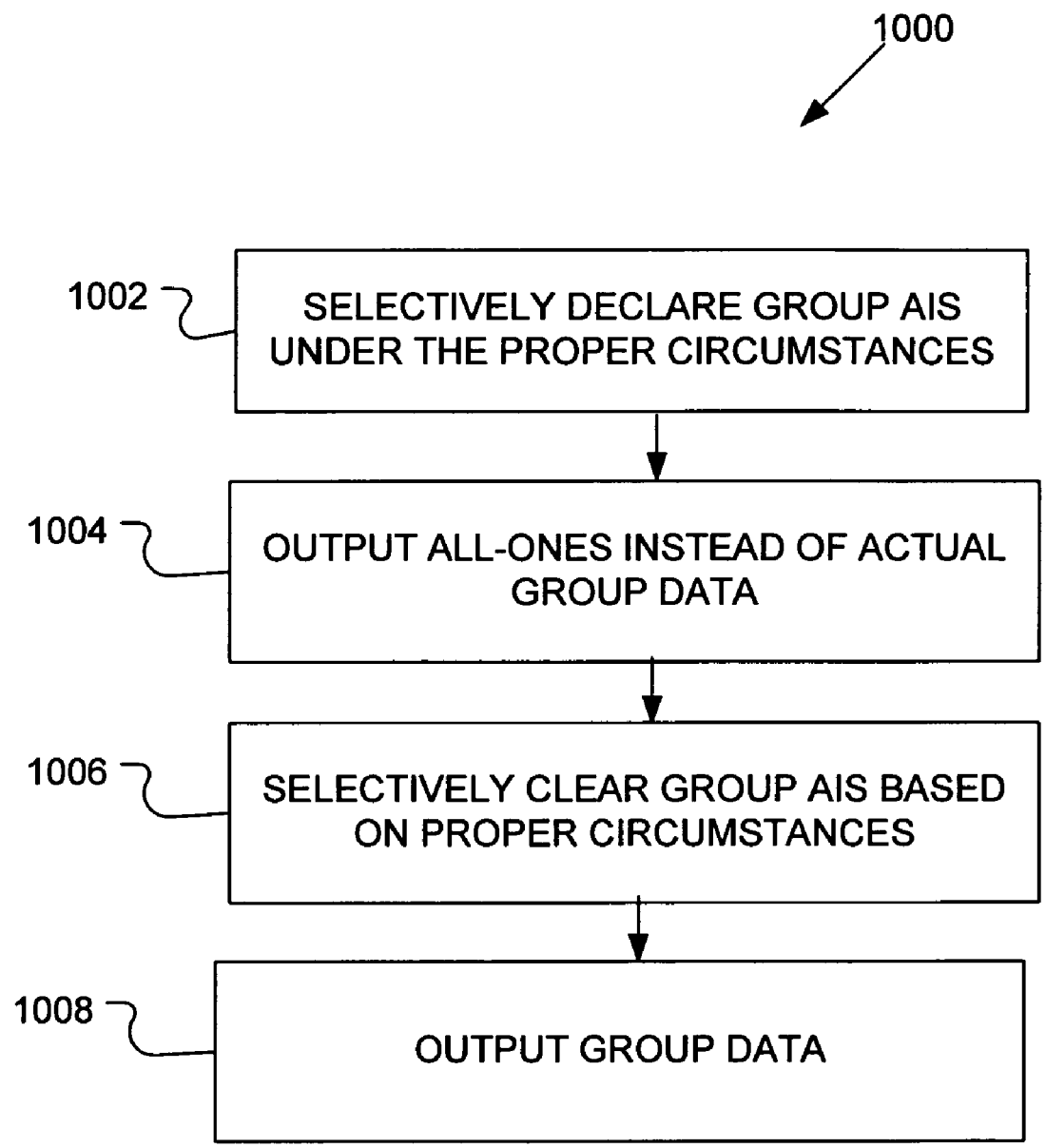
FIG. 10 depicts a flow diagram of a process that can be used in embodiments of the present invention to determine when to declare and clear group AIS.

FIG. 10 depicts a flow diagram of a process 1000 that can be used in embodiments of the present invention to determine when to declare and clear group AIS. Process 1000 may be used by a framer in a communications system that is capable of receiving virtually concatenated members.

In block 1002, process 1000 may selectively declare group AIS under the proper circumstances. For example, a group may include multiple members. In some embodiments, group AIS may be declared approximately when any member of a virtually concatenated group declares AIS. For example, an AIS condition for any member of a virtually concatenated group may be declared as described in ITU-T G.783 or ITU-T G.806. In some embodiments of process 1000, member(s) with AIS condition are not removed as per Link Capacity Adjustment Scheme (LCAS) either at least because LCAS is not used in the application or because network management does not use LCAS to remove this type of faulty member.

In block 1004, process 1000 may output all-ones instead of actual group data. For example, in some embodiments, a group may output all-ONEs within 250 µs (microseconds) of AIS declaration of any of its members at least in accordance at least with ITU-T G.783 or ITU-T G.806, although other times may be used.

In block 1006, process 1000 may selectively clear group AIS based on proper circumstances. In some embodiments, group AIS may be cleared when either of the following two conditions is met after AIS clearing for member X:

RA=WAX; or
(wa(X)−RA)<(WAX−RA),
where:
   X may represent the last member in a group to clear individual AIS;
   RA may represent a current group read address across all members in a group;
   WAX may represent a write address for member X when AIS for member X is cleared; and
   wa(X) may represent current write address for member X.

Note the above subtractions are used because wrap around circular buffers are used (i.e., the write and read addresses increase in value from beginning (address 0, in the example of FIG. 2) to end (address MAX in the example of FIG. 2)) and there is wrap around of addresses. Block 1006 can be used where process 1000 uses buffers such as those described with respect to FIG. 2, although other types of buffers may be used.

In block 1008, process 1000 may output group data instead of all-ones. For example, block 1008 may output actual group data within 250 µs (microseconds) of clearing of group AIS at least in accordance with ITU-T G.783 or ITU-T G.806, although other times may be used. Group data based on aligned members may be output after clearing of group AIS.

Embodiments of the present invention may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   declaring a member alarm indication signal (AIS) by a processor;
   selectively setting a group AIS, corresponding to a group, based in part on the declaring the member AIS;
   selectively providing all-ones as an output based in part on setting of the group AIS;
   clearing at least one member AIS corresponding to a member of the group;
   selectively clearing the group AIS based in part on individual read and write indices for a last member in the group to clear AIS; and
   selectively providing an output from the group after the group AIS is cleared.

2. The method of claim 1, further comprising indicating group AIS using an AIS status register.

3. The method of claim 1, wherein the setting a group AIS occurs at approximately the same time as the declaring a member AIS.

4. The method of claim 1, wherein the clearing a group AIS comprises selectively clearing group AIS based in part on a current group read address across all members approximately equaling the write address for the last member in a group to clear individual AIS when AIS of the last member is cleared.

5. The method of claim 4, wherein the clearing a group AIS comprises selectively clearing group AIS based in part on a difference between (i) a current write address for the last member in a group to clear individual AIS and (ii) the current group read address being approximately less than a difference between (iii) the write address for the last member in a group to clear individual AIS when AIS of the last member is cleared and (iv) the current group read address.

6. The method of claim 1, further comprising providing delay compensation for members.

7. The method of claim 1, wherein each member comprises a member of a group transmitted at least using virtual concatenation payload support for a SONET/SDH.

8. An apparatus comprising:
   logic circuitry to:
      declare a member AIS;
      selectively set a group AIS, corresponding to a group, based in part on the declaration of the member AIS;
      selectively provide all-ones as an output based in part on setting of the group AIS;
      clear at least one member AIS corresponding to a member of the group;
      selectively clear the group AIS based in part on individual read and write indices for a last member in the group to clear AIS; and
      selectively provide an output from the group after the group AIS is cleared.

9. The apparatus of claim 8, further comprising:
a group AIS status register capable to indicate group alarm indication signal (AIS) condition.

10. The apparatus of claim 8, wherein the logic to set a group AIS is to set the group AIS at approximately the same time as that to declare a member AIS.

11. The apparatus of claim 8, wherein the logic to clear a group AIS comprises logic to selectively clear group AIS based in part on a current group read address across all members approximately equaling the write address for the last member in a group to clear individual AIS when AIS of the last member is cleared.

12. The apparatus of claim 11, wherein the logic to clear a group AIS comprises logic to selectively clear group AIS based in part on a difference between (i) a current write address for the last member in a group to clear individual AIS and (ii) the current group read address being approximately less than a difference between (iii) the write address for the last member in a group to clear individual AIS when AIS of the last member is cleared and (iv) the current group read address.

13. The apparatus of claim 8, further comprising logic to provide delay compensation for members.

14. The apparatus of claim 8, wherein each member comprises a member of a group transmitted at least using virtual concatenation payload support for a SONET/SDH.

15. A system comprising:
a first line card;
a backplane interface; and
a second line card communicatively coupled to the first line card via the backplane interface and comprising a processor to:
declare a member AIS,
selectively set a group AIS, corresponding to a group, based in part on the declaration of the member AIS,
selectively provide all-ones as an output based in part on setting of the group AIS,
clear at least one member AIS corresponding to a member of the group,
selectively clear the group AIS based in part on individual read and write indices for a last member in the group to clear AIS, and
selectively provide an output from the group after the group AIS is cleared.

16. The system of claim 15, further comprising a host-control plane controller communicatively coupled to the processor.

17. The system of claim 15, further comprising a system fabric communicatively coupled to the backplane interface.

18. The system of claim 15, wherein the first line card comprises a line input.

19. The system of claim 15, further comprising a network processor and an interface to at least provide intercommunication at least between the processor and the network processor.

20. The system of claim 19, further comprising a physical layer processor communicatively coupled to the processor.

* * * * *